ORIGEN S. PERKINS
MELVIN R. KRUEGER
INVENTORS

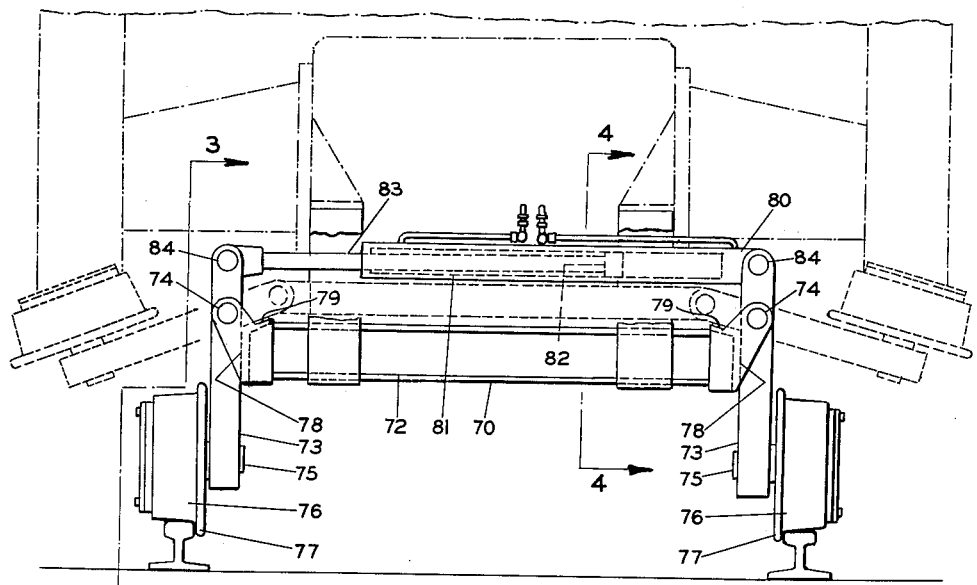
FIG. 2
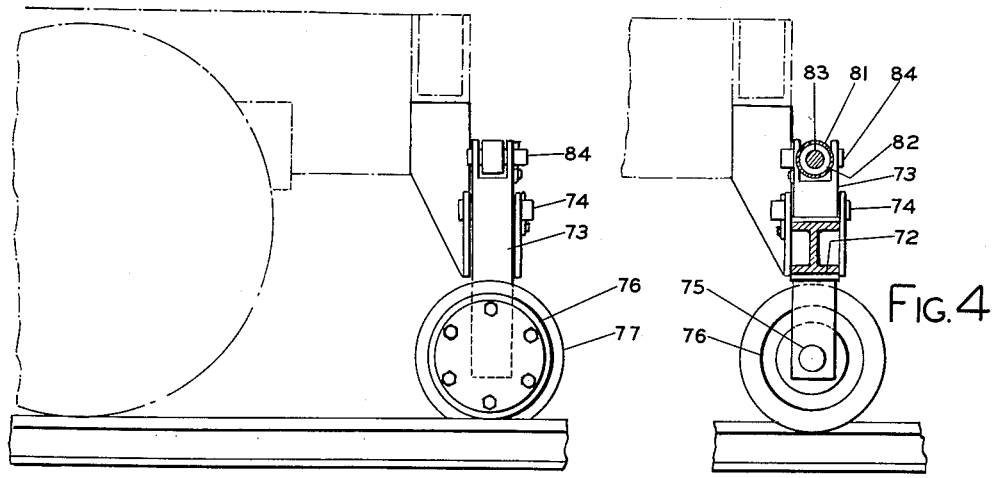
FIG. 3
FIG. 4
ORIGEN S PERKINS
MELVIN R. KRUEGER
INVENTORS Feb. 13, 1962　　　O. S. PERKINS ETAL　　　3,020,858
ROAD-RAIL VEHICLE Filed Oct. 8, 1957　　　　　　　　　　　　　6 Sheets-Sheet 3

ORIGEN S. PERKINS
MELVIN R. KRUEGER
INVENTORS

BY *Robert J. Steininger*
ATTORNEY

ORIGEN S. PERKINS
MELVIN R. KRUEGER
INVENTORS 3,020,858
ROAD-RAIL VEHICLE
Origen S. Perkins, Hales Corners, and Melvin R. Krueger, South Milwaukee, Wis., assignors to Bucyrus-Erie Company, South Milwaukee, Wis., a corporation of Delaware
Filed Oct. 8, 1957, Ser. No. 688,878
8 Claims. (Cl. 105—215)

This invention relates to new and useful improvements in combined road-rail vehicles, and more particularly to such vehicles that comprise main wheels which carry the entire vehicle load during highway travel and which during rail travel are guided upon the rails by, and share the load with, cooperating sets of pilot wheels.

The principal objects of the invention are to provide a road-rail vehicle in which:

(1) The means for shifting the pilot wheels into rail-travel position is so designed that it does not carry any substantial load of the vehicle during rail travel, and none of such load during the operation of shifting the pilot wheels into and out of rail-travel position.

(2) Release of the pilot wheel shifting means during rail travel will not reelase the pilot wheels from their load-bearing rail-travel position.

(3) Means independent of the pilot wheel shifting means is provided for raising, lowering, carrying, and laterally shifting the vehicle into and out of position over the rails.

(4) The pilot wheels are held locked in rail-travel position by the rails on which they travel.

(5) The pilot wheel mounting and shifting means is simple, strong and readily operated to shift the pilot wheels from operative into inoperative position.

In addition to the above-stated principal objects, a number of novel and useful details have been worked out, which will be readily evident as the description progresses.

The invention consists in the novel parts and in the combination and arrangement thereof, which are defined in the appended claims, and of which one embodiment is exemplified in the accompanying drawings, which are hereinafter particularly described and explained.

Throughout the description the same reference number is applied to the same member or to similar members.

FIGURE 2 is an enlarged rear elevation, along the line 2—2 of FIGURE 1 partly broken away, showing the rear pilot-wheel assembly, with the pilot wheels in lowered rail-engaged position shown in full lines, and the pilot wheels in raised disengaged position shown in broken lines.

FIGURE 3 is an enlarged side elevation, along the line 3—3 of FIGURE 2, of the rear pilot-wheel assembly.

FIGURE 4 is a cross-section along the line 4—4 of FIGURE 2.

It will be appreciated from a complete understanding of the invention, that many of its features may be embodied in a wide variety of vehicles intended for operation both upon highways and upon rails, and that such features may be embodied in various different forms other than the forms specifically disclosed herein. By way of illustration but not of limitation, the invention is herein disclosed in connection with vehicles having main sets of pneumatic-tired wheels which normally sustain the entire vehicle load during highway travel, and which, during rail travel, are guided upon the rails by, and share the vehicle load with, flanged pilot wheels.

Figure 1:
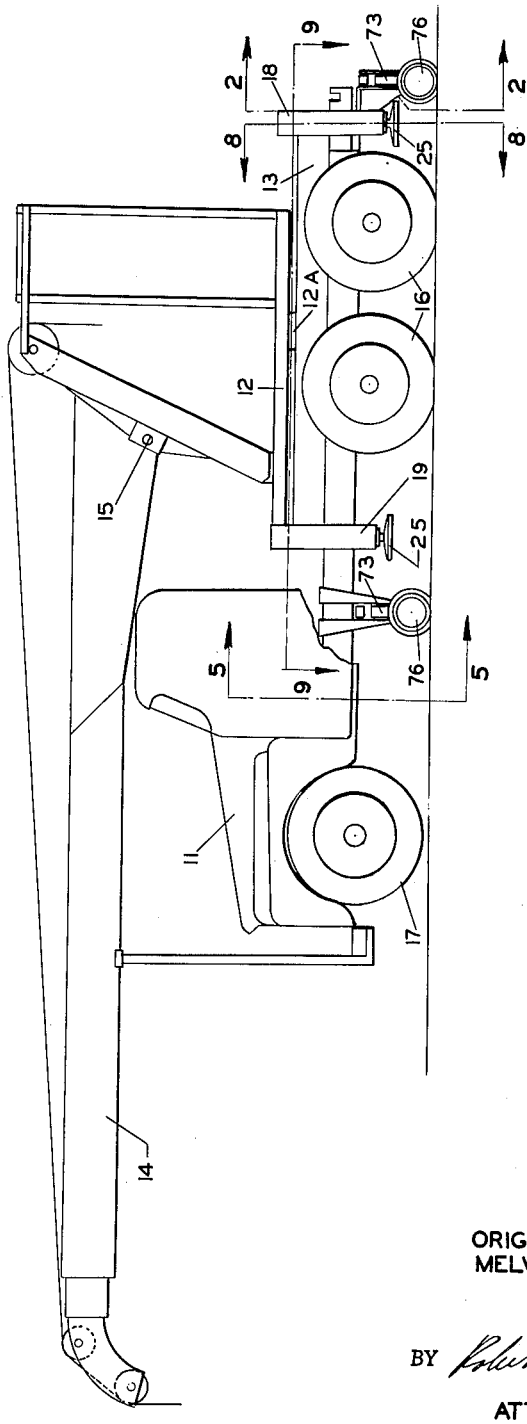
FIGURE 1 is a side elevation of a motor vehicle embodying the present invention.

Referring more particularly to the drawings, it is seen that in FIGURE 1 the numeral 11 designates a vehicle, in the form of a truck frame, the construction of which includes a turntable 12 mounted on a body structure 13 which supports the operating mechanism, the crane boom 14 being pivoted as at 15 to the turntable 12. The rear end of the vehicle is supported in a conventional manner by pneumatic-tired wheels 16, which are normally the driving wheels of the vehicle, and the front end is supported by pneumatic-tired wheels 17.

Figure 8:
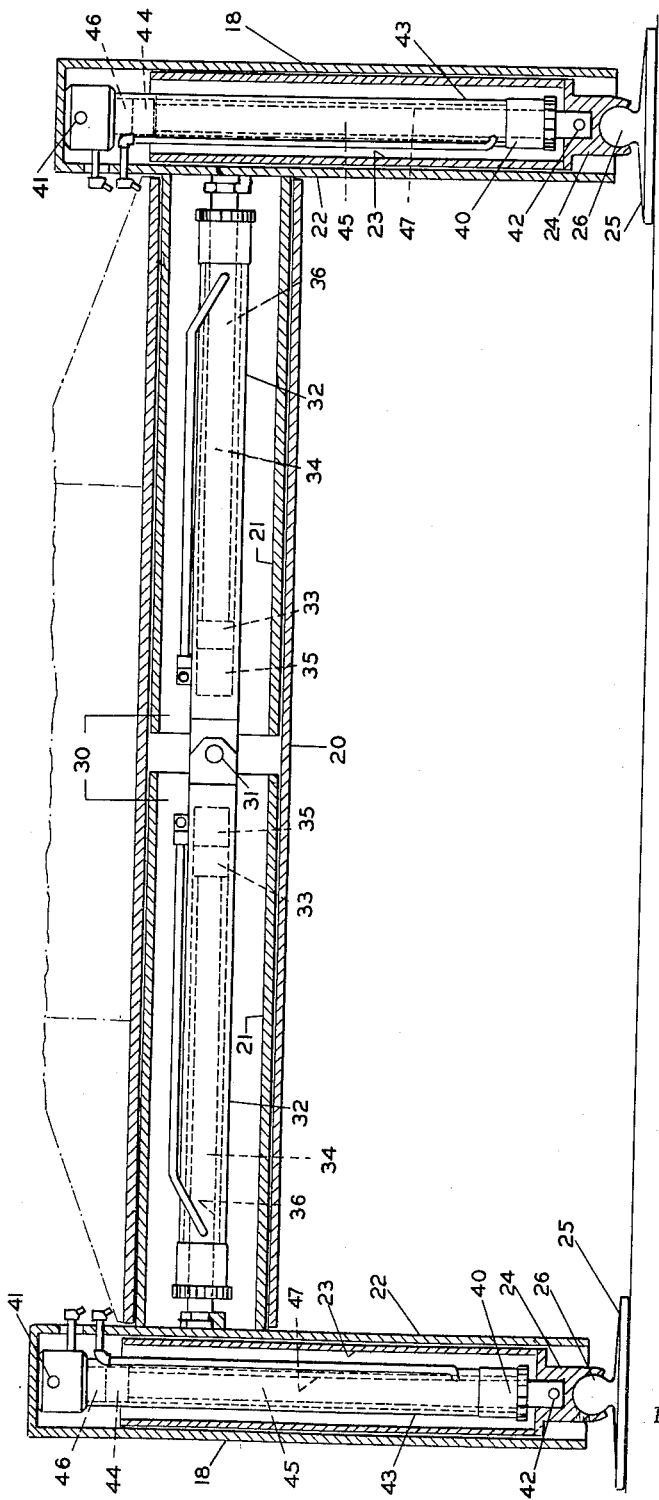
FIGURE 8 is an enlarged sectional elevation along the line 8—8 of FIGURE 1, showing the rear outrigger assembly.

Rearwardly and forwardly of rear wheels 16, rear and front outrigger assemblies 18 and 19 respectively are suitably secured to the body 13 of vehicle 11. Each outrigger assembly (FIGURE 8) includes a traverse sleeve 20, preferably welded to the body 13 and a pair of oppositely movable horizontal outrigger supports 21 which telescoped within the sleeve 20. These outrigger supports 21 have their outer ends rigidly connected to vertical outrigger sleeves 22. Telescoped within each vertical outrigger sleeve 22 is a downwardly movable outrigger leg 23. The lower end of each vertical sleeve 22 is open, and the lower end of each outrigger leg 23 is closed by an inner leg member 24. To the underside of each inner leg member 24 a foot member 25 is secured, preferably by a universal joint 26.

Suitably supported in a horizontal position within each outrigger sleeve 20, are a pair of hydraulic ram assemblies 30, preferably mounted at their inner end on sleeve 20 as by horizontal pin 31 and at their outer end on vertical sleeve 22 in suitable fashion. Each ram assembly 30 comprises a cylinder 32, piston 33 and piston rod 34, the ram assembly being preferably mounted so that the cylinder 32 is connected to the horizontal sleeve 20 and the piston rod 34 is connected to the vertical sleeve 22. Thus, when hydraulic fluid is forced under pressure into inner chamber 35 of cylinder 32, the piston 33 will move outwardly to cause outward extension of horizontal outrigger support 21 and the outrigger which it supports, and similarly when hydraulic fluid is forced under pressure into outer chamber 36, piston 33 will retract the outrigger support 21.

Suitably supported in a vertical position within each vertical outrigger sleeve 22 is a vertical ram assembly 40 which is preferably connected at its upper end to vertical sleeve 22 by horizontal pin 41, and is connected at its lower end to inner leg member 24 by pin 42. Each vertical ram assembly 40 comprises a cylinder 43, piston 44 and piston rod 45, the ram assembly being preferably so oriented, that the cylinder 43 is connected to vertical sleeve 22, and piston rod 45 is connected to inner leg member 24. Thus, when hydraulic fluid is forced under pressure into the upper chamber 46 of ram assembly 40, it will act to move piston 44 downwardly to cause downward extension of foot member 25 into a ground-engaging position; and similarly when hydraulic fluid is forced under pressure into lower chamber 47 of ram assembly 40, the piston 44 is caused to move upwardly to retract the ram assembly and raise the foot member 25 out of ground engagement.

Figure 10:
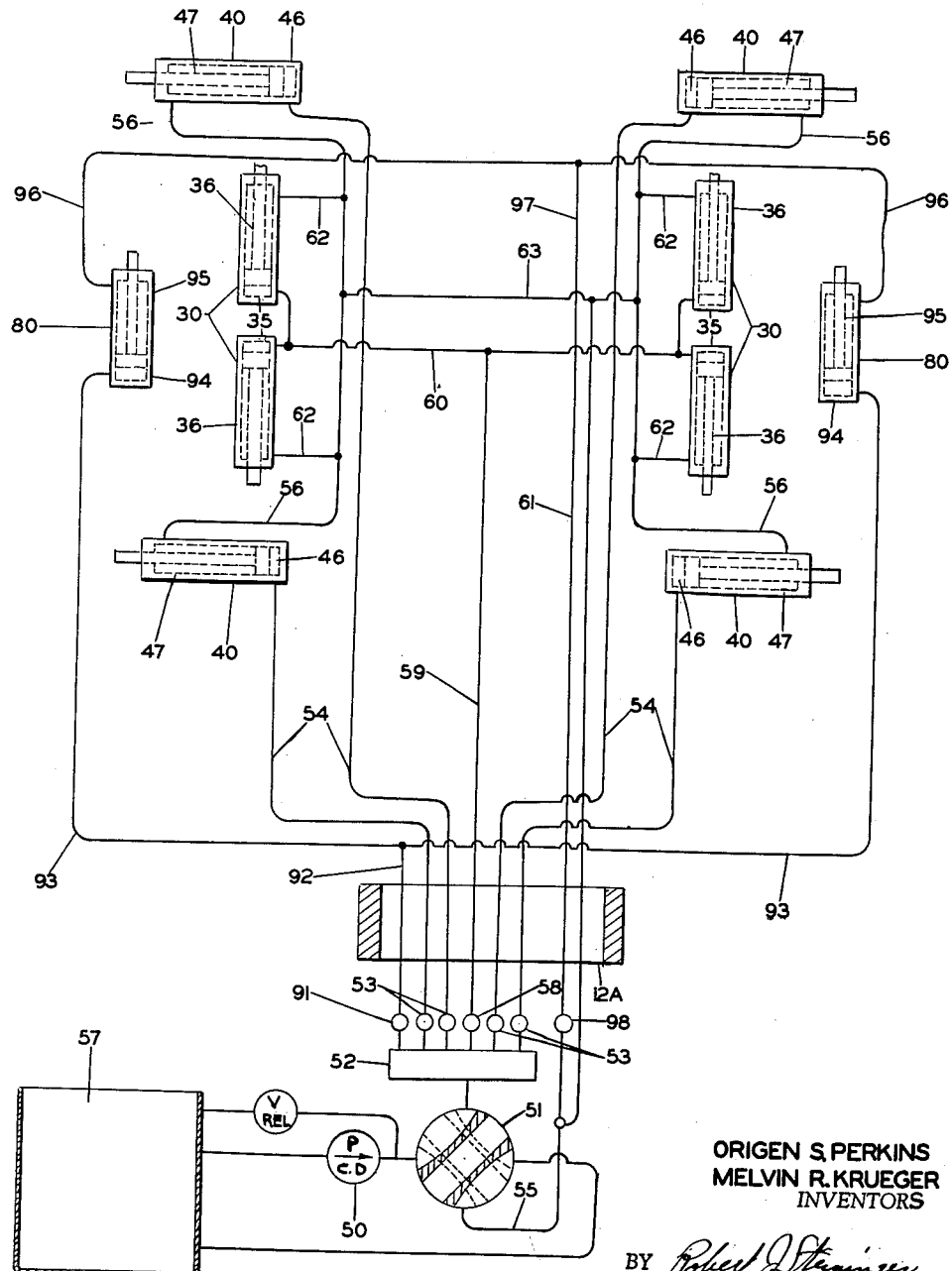
FIGURE 10 is a schematic diagram of the hydraulic system for controlling the pilot-wheel and outrigger assemblies.

Turning now to FIGURE 10, it is seen that hydraulic fluid under pressure for operating the horizontal outrigger ram assemblies 30 is supplied from a conventional source of pressure fluid such as tank 57 and pump 50, preferably located on turntable 12, through conventional reversing valve 51, manifold 52, individual shut-off valve 58 and hydraulic lines 59 and 60 simultaneously to inner chambers 35 of the ram assemblies 30; exahust fluid from outer chambers 36 flowing through lines 62, 56, 63 and 61, the latter extending through center pintle 12a, and through line 55 to reversing valve 51 and tank 57. Thus, when the reversing valve is set to direct pressure fluid to manifold 52, and valve 58 is open, pressure fluid is forced simultaneously into inner chambers 35, so that all four outriggers are extended horizontally outwardly simultaneously. If it be desired to actuate only one or more of the horizontal outrigger ram assemblies 30, the outrigger feet of the other assemblies are actuated downwardly to engage the ground as hereinafter described, to prevent horizontal movement of such other outriggers. Pressure fluid will then actuate the horizontal rams of only the outrigger or outriggers that do engage the ground.

Inward retraction of the horizontal ram assemblies 30 is accomplished by reversing valve 51 to direct pressure fluid from pump 50 through the reversing valve 51 to line 55 and lines 61, 63, 56 and 62 to outer chambers 36 of ram assemblies 30, exhaust flow from inner chambers 35 then passing through lines 60 and 59, through open valve 58, manifold 52 and reversing valve 51 to tank 57.

Vertical outrigger ram assemblies 40 are similarly actuated by pressure fluid supplied from tank 57 and pump 50, through reversing valve 51, manifold 52 to individual shut-off valves 53 located in hydraulic lines 54 which lead individually from valves 53 through center pintle 12a of turntable 12 to the upper chamber 46 of each vertical ram assembly 40. When the valve 51 is set to permit flow of pressure fluid from pump 50 to manifold 52, and each of valves 53 is open, hydraulic fluid under pressure is forced simultaneously through all of lines 54 thereby causing all four of outrigger feet 25 to extend downwardly simultaneously. In case the ground is uneven, the individual valves 53 may be manipulated to stop one or more of the feet in advance of the other feet.

Exhaust flow of fluid occurs from lower chambers 47 of outrigger ram assemblies 40 through hydraulic lines 56 to common lines 63 and 61, the latter of which passes through center pintle 12a, through line 55 and reversing valve 51 to tank 57.

When reversing valve 51 is reversed to direct fluid under pressure from the pump 50 to lines 55 and 61 (instead of to manifold 52), hydraulic fluid under pressure is forced simultaneously through all of lines 56 into lower chambers 47 of outrigger ram assemblies 40, to thereby retract all four outrigger ram assemblies 40 simultaneously. During retraction of the vertical ram assemblies 40, individual valves 53 and reversing valve 51 are normally open to permit exhaust fluid to be forced back from upper chambers 46 through lines 54, manifold 52, and reversing valve 51 to tank 57. If it be desired to stop retraction of one or more of the outriggers in advance of the other outriggers, one or more of the individual shut-off valves 53 may be manipulated to stop such retraction.

Referring now to FIGURES 1 to 9 inclusive, it is seen that rearwardly and forwardly of outrigger assemblies 18 and 19 and rear and front pilot-wheel assemblies 70 and 71 respectively are suitably secured to the body 13 of vehicle 11.

Each pilot-wheel assembly includes a transverse horizontal leg 72, to each end of which a vertical leg 73 is pivoted for lateral movement in a transverse vertical plane about a pivot pin 74 located intermediate the ends of leg 73. At the lower end of each vertical leg 73 is an outwardly extending normally horizontal transverse axle 75 on which flanged rail wheel 76 is journalled. Horizontal double-acting hydraulic ram assembly 80 comprising a cylinder 81, piston 82, and piston rod 83 pivotally interconnects the upper end of each vertical leg 73 of each pilot-wheel assembly at horizontal pivot pins 84, and serves to actuate the vertical legs 73 to pivot simultaneously in a vertical transverse plane about pivot pins 74 from a normal vertical position (full lines in FIGURES 2 and 5) in which the rail wheels 76 are lowered in rail-engaged position to an outwardly inclined position (broken lines in FIGURES 2 and 5) in which the rail wheels 76 are raised in rail disengaged position for highway travel. When the pilot-wheel assembly is in rail-engaged position, the inward reaction of the rails against the side of the inner flange 77 of the rail wheels 76 prevents outward lateral shifting of the vertical legs 73 about pivot pins 74; and the vertical abutment surface 78 at each end of horizontal leg 72 engaging the inner side of each vertical leg 72 below pivot pin 74 prevents inward shifting of the vertical legs about pivot pin 74. Thus, the pilot wheels are held substantially locked in rail-travel position by the rails on which they travel and release of the ram assembly 80 during rail travel will not release the pilot wheels from their load-bearing rail-travel position. This is an important safety feature in the event of failure of hydraulic pressure in the horizontal ram assembly 80.

Even if, in order to stiffen the pilot-wheel assembly against vibration during rail travel, the ram assembly 80 is extended and locked to hold vertical legs 73 pressed firmly against abutments 78 at each end of horizontal leg 72, thereby relieving flanges 77 from this function, the load thus imposed on the ram assembly 80 is relatively low due to the fact that the moment arm of the load reaction of rail wheels 76 on the rails about pivot pin 74 is relatively short. This permits use of a relatively small and inexpensive ram assembly 80.

In their inclined raised position (for highway travel, as shown in broken lines in FIGURES 2 and 5), the inner sides of the upper ends of vertical legs 73 engage inclined stops 79 on each outer end of horizontal leg 72.

With respect to the above-described features, the rear and front pilot-wheel assemblies 70 and 71 are the same. The assemblies differ, however, with respect to the following features. The rear assembly 70 is rigidly secured, preferably by welding to the rear end of body structure 13 of vehicle 11, and on this account horizontal leg 72 is most conveniently constructed in the form of an I-beam (see FIGURE 4). Forward pilot wheel assembly 71 is, however, pivotally connected to the body structure 13 about longitudinal horizontal pivot pin 85 which is centrally located on the vehicle, and on this account the horizontal leg 72 of pilot wheel assembly 71 is most conveniently constructed in the form of a box-beam (see FIGURE 7). While this is the preferred means for connecting the forward pilot wheel assembly to the body structure, it should be understood that other means of connecting the front assembly to the body structure, such as by welding, may also be used.

Figure 5:
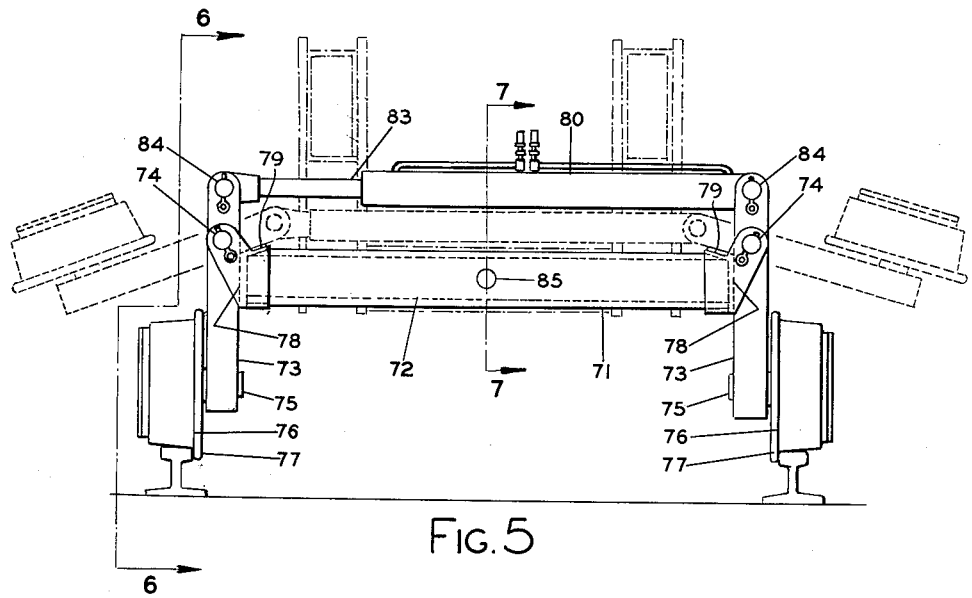
FIGURE 5 is an enlarged rear elevation, along the line 5—5 of FIGURE 1, showing the front pilot-wheel assembly, with pilot wheels in lowered rail-engaged position in full lines and with pilot wheels in raised disengaged position in broken lines.
Figure 6:
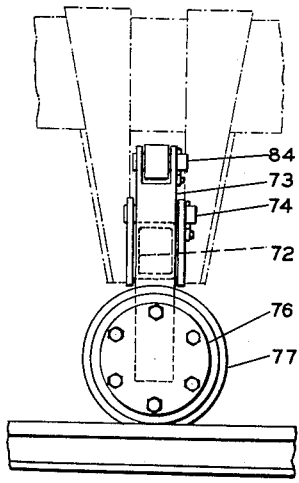
FIGURE 6 is an enlarged side elevation, along the line 6—6 of FIGURE 5, of the front pilot-wheel assembly.
Figure 7:
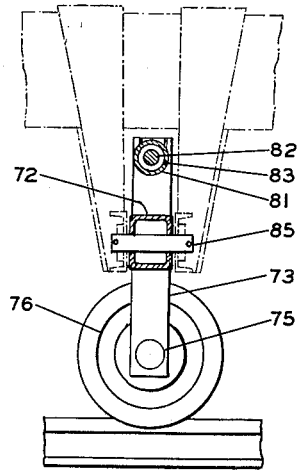
FIGURE 7 is a cross-section, along the line 7—7 of FIGURE 5.

Referring now to FIGURE 10, it is seen that hydraulic fluid under pressure for operating the horizontal pilot-wheel ram assemblies 80 is supplied from pump 50 through reversing valve 51 and manifold 52 to individual shut-off valve 91 located in hydraulic line 92 which passes through center pintle 12a of turntable 12 to a common line 93 interconnecting chambers 94 of ram assemblies 80, exhaust fluid from chambers 95 being conducted through common line 96 and return line 97 through center pintle 12a, valve 98 and line 55 to reversing valve 51. When individual outrigger valves 53 are closed and the reversing valve 51 is set to direct flow from the pump 50 to manifold 52, and each of valves 91 and 98 are open, hydraulic fluid under pressure is forced simultaneously through lines 92, 93 and exhausted through lines 96, 97 and 55, thereby causing both pilot wheel assemblies 70 and 71 to be shifted into rail-engaging position (FIGURES 2 and 5). Reversal of reversing valve 51 will cause a reverse flow to actuate ram assemblies 80 to shift pilot-wheel assemblies 70 and 71 to disengage position. If it be desired to shift only one of the pilot-wheel assemblies from engaged to disengaged position, the outriggers may be adjusted so that only that pilot-wheel assembly is raised clear of the rails, the other pilot-wheel assembly being held locked in rail-travel position by the rails. Hydraulic pressure fluid will then actuate only one horizontal ram assembly.

The procedure for manipulating the vehicle embodying the present invention to change from a road travel condition to a rail travel condition is as follows. The vehicle is driven on a highway to a rail crossing and positioned in substantally longitudinal alignment with the rails so that at least one pair of pilot wheels, when extended, will be in vertical alignment with the rails and their planes of rotation will be substantially in longitudinal alignment with the rails. Assuming that the other pair of pilot wheels will not be in vertical alignment when extended to the rail engaging position, that end of the vehicle carrying the non-aligned pilot wheels must be shifted laterally so that both pairs of pilot wheels are in alignment with the rails. Since a sufficient area is not always available for manuevering the vehicle in a fore and aft direction under its own power to accomplish a lateral shifting of one end, operation of the horizontal outrigger members and the vertical ram assemblies carried thereon can shift one end of the vehicle relative to the rails to align vertically and longitudinally the pilot wheels of that end while the pilot wheels of the other end remain in vertical alignment with the rails.

To simplify the description, we shall assume that the rear pair of pilot wheels have been aligned vertically with the rails and that the front pair of pilot wheels must be shifted to the left to be in alignment when extended to a rail-engaging position. If the rear pilot wheels were to be aligned, the procedure would be the same as described below except that a rear outrigger would be used for shifting the vehicle; if the vehicle must be shifted to the right, the outrigger used would be opposite from that described below. The sequence of operation in shifting the front end of the vehicle to the left to align vertically and longitudinally the front pilot wheels with the rails while maintaining the rear pilot wheels in vertical alignment with the rails is:

(1) With all horizontal outriggers in a retracted position, extend all vertical ram assemblies to raise the vehicle sufficiently to permit lowering of the pilot wheels.

(2) Lower both the front and the rear pilot wheels to a rail-engaging position. The rear pilot wheels are now in vertical alignment and their respective planes of rotation in substantial longitudinal alignment with the rails; the front end of the vehicle must now be shifted to the left to align the front pilot wheels with the rails.

(3) Retract the front vertical ram assembly on the left side of the vehicle, the side toward which the vehicle is to be shifted.

(4) Open valve 58 which normally extends all horizontal outriggers. Since three of the outriggers, all except the left front, are in contact with the ground by means of their respective vertical ram assemblies, only the left front outrigger is free to move at the initial opening of valve 58; consequently the outrigger toward which the vehicle is to be shifted will be extended first. As soon as this outrigger, the left front one, is extended, valve 58 is closed before any movement of the other three outriggers occurs.

(5) Retract all of the previously extended vertical ram assemblies.

(6) Extend the vertical ram assembly of the now extended horizontal outrigger, the left front one, toward which the vehicle is to be shifted. By extending this vertical ram assembly, a portion of the weight of the vehicle is supported by the ram, thereby tending to anchor the ram to the ground; the rear wheels support remaining weight.

(7) Retract the previously extended horizontal outrigger, the left front, thereby shifting the vehicle toward the extended vertical ram of the left front outrigger. Assuming that the vehicle has been shifted a sufficient distance to align and to engage the front pilot wheels with the rails, retraction of the horizontal outrigger is terminated. Since the other three outriggers have not been extended, they will not be retracted with the left front outrigger; since their respective vertical ram asesmblies are not anchored to the ground, the outriggers will be shifted with the vehicle and no relative movement between the three outriggers and the vehicle will occur.

(8) Retract the anchored left front vertical ram assembly.

(9) If necessary, complete the retraction of the left front outrigger.

The vehicle is now ready for rail travel with both pairs of pilot wheels in engagement with the rails and all vertical ram assemblies retracted.

The above describes the method of pulling the vehicle toward an extended vertical ram assembly which is anchored to the ground by virtue of its supporting a portion of the weight of the vehicle. An alternate method of laterally shifting the vehicle is by pushing the vehicle away from an extended vertical ram assembly which is anchored to the ground by virtue of its supporting a portion of the weight of the vehicle. This method is as follows:

(1) Position the vehicle in substantial longitudinal alignment with a pair of laterally spaced rails so that at least either of the front and rear pair of pilot wheels, when extended, will be in vertical alignment with the rails.

(2) With all horizontal outriggers in a retracted position, extend all vertical ram assemblies to a ground engaging position to raise the vehicle sufficiently to permit lowering of the pilot wheels.

(3) Retract all vertical ram assemblies except that vertical ram assembly on that end of the vehicle to be shifted and on the side of the vehicle opposite to which the vehicle is to be shifted, so that the extended vertical ram assembly is supporting a sufficient portion of the weight of the vehicle to anchor the ram assembly to the ground; wheels on opposite vehicle end support remaining weight.

(4) Open valve 58 to extend the horizontal outriggers; since that vertical ram assembly on that side of the vehicle opposite to which the vehicle is to be shifted and at that end of the vehicle to be shifted in anchored to the ground, the other outriggers will be extended first. When these outriggers have reached the limit of their travel, the outrigger carrying the anchored vertical ram assembly will be extended, thereby pushing that end of the vehicle away from the anchored vertical ram assembly. When the one end of the vehicle has ben pushed a sufficient distance so that both pairs of pilot wheels are in alignment with the rails, valve 58 is closed to terminate the extension of the outrigger-carrying the anchored ram assembly.

(5) Retract the previously anchored vertical ram assembly.

(6) Retract the horizontal outriggers.

Figure 9:
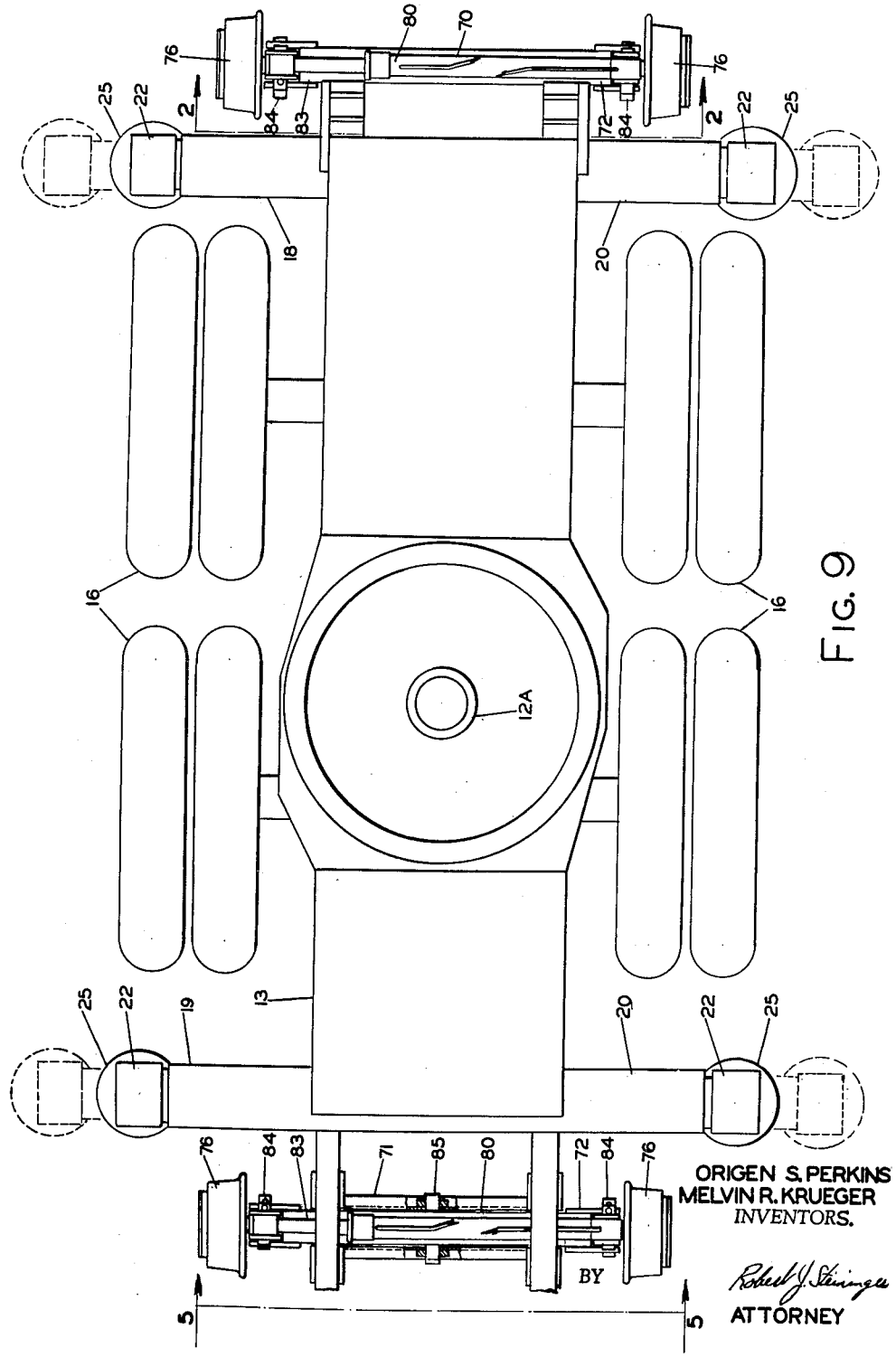
FIGURE 9 is a plan view, along the line 9—9 of FIGURE 1, of a portion of the vehicle sub-base with associated pilot-wheel and outrigger assemblies.

As can be seen in FIGURES 1 and 9, the center pintle 12a is located forwardly of the transverse centerline of the rear bogie, or tandem-axle road wheels. This location is in accordance with standard vehicle crane design practice to provide the crane with a greater lifting capacity with the boom disposed over the rear of the vehicle; it also results in locating the center of gravity of the entire vehicle, including the turntable 12, further forward of the transverse centerline of the tandem axle bogie. In commercial practice, the cranes constructed in accordance with the proportions shown in FIGURES 1 and 9 have their respective centers of gravity located forwardly of said transverse centerline of the bogie a distance equal to approximately 25–30% of the wheelbase of the vehicle. As an example, one model of such vehicles has a wheelbase of 165", and, when constructed as aforesaid, is provided with a center of gravity 56" forward of said transverse centerline and 44" forward of pintle 12a. Accordingly, when it is desired to shift laterally the rear end of the vehicle by means of pushing away from or pulling towards a vertically extended rear outrigger ram, such a shifting is possible without rotation of the crane, since the center of gravity is within the imaginary triangle formed by a line connecting the three points of vehicle support, i.e., the two front pilot wheels engaging the track and the one rear outrigger ram which has been vertically extended.

To manipulate one end of the vehicle to align both pairs of pilot wheels with a railroad track to permit changing from highway road travel to rail travel is as follows: The vehicle is driven on a highway to a rail crossing and positioned in substantially longitudinal alignment with the rails so that at least one pair of pilot wheels, when extended, will be in vertical alignment with the rails and their planes of rotation will be substantially in longitudinal alignment with the rails. Assuming that the other pair of pilot wheels will not be in vertical alignment when extended to the rail engaging position, that end of the vehicle carrying the non-aligned pilot wheels must be shifted laterally so that both pairs of pilot wheels are in alignment with the rails. Since a sufficient area is not always available for maneuvering or "jockeying" the vehicle in a fore and aft direction under its own power to accomplish a lateral shifting of one end, operation of the horizontal outrigger members and the vertical ram assemblies carried thereon can shift one end of the vehicle relative to the rails to align vertically and longitudinally the pilot wheels of that end while the pilot wheels of the other end remain in vertical alignment with the rails.

To simplify the description, we shall assume that the front pair of pilot wheels have been aligned vertically with the rails and that the rear pair of pilot wheels must be shifted to the left to be in alignment when extended to a rail-engaging position. The sequence of operation in shifting the rear end of the vehicle to the left to align vertically and longitudinally the rear pilot wheels with the rails while maintaining the front pilot wheels in substantial vertical alignment with the rails is:

(1) With all horizontal outriggers in a retracted position, extend all vertical ram assemblies to raise the vehicle sufficiently to permit lowering of the pilot wheels.

(2) Lower both the front and the rear pilot wheels to a rail-engaging position. The front pilot wheels are now in vertical alignment and their respective planes of rotation in substantial longitudinal alignment with the rails; the rear end of the vehicle must now be shifted to the left to align the rear pilot wheels with the rails.

(3) Retract the rear vertical ram assembly on the left side of the vehicle, the side toward which the vehicle is to be shifted.

(4) Open the hydraulic valve which normally extends all horizontal outriggers. Since three of the outriggers, all except the left rear, are in contact with the ground by means of their respective vertical ram assemblies, only the left rear outrigger is free to move at the initial opening of the hydraulic valve; consequently the outrigger toward which the vehicle is to be shifted will be extended first. As soon as this outrigger, the left rear one, is extended, the hydraulic valve is closed before any movement of the other three outriggers occurs.

(5) Retract all of the previously extended vertical ram assemblies.

(6) Extend the vertical ram assembly of the now extended horizontal outrigger, the left rear one, toward which the vehicle is to be shifted. By extending this vertical ram assembly, the rear end of the vehicle is raised so that the road wheels and pilot wheels will be above the rails. A portion of the weight of the vehicle is thereby supported by the ram, which tends to anchor that ram to the ground; the front pilot wheels support the remaining weight.

(7) Retract the previously extended horizontal outrigger, the left rear, thereby shifting the vehicle toward the extended vertical ram of the left rear outrigger. Assuming that the vehicle has ben shifted a sufficient distance to align the rear pilot wheels with the rails, retraction of the horizontal outrigger is terminated. Since the other three outriggers have not been extended, they will not be retracted with the left rear outrigger; since their respective vertical ram assemblies are not anchored to the ground, the outriggers will be shifted with the vehicle and no relative movement between the three outriggers and the vehicle will occur.

(8) Retract the anchored left rear vertical ram assembly to lower the rear pilot wheels onto the rails.

(9) If necessary, complete the horizontal retraction of the left rear outrigger.

The vehicle is now ready for rail travel with both pairs of pilot wheels in engagement with the rails and all vertical ram assemblies retracted.

The above describes the method of pulling the vehicle toward an extended vertical ram assembly which is anchored to the ground by virtue of its supporting a portion of the weight of the vehicle. An alternate method of laterally shifting the vehicle is by pushing the vehicle away from an extended vertical ram assembly which has raised the pilot wheels sufficiently to clear the rails during the lateral movement and is anchored to the ground by virtue of its supporting a portion of the weight of the vehicle.

With the one rear outrigger ram anchored to the ground by reason of its supporting a portion of the vehicle weight in raising the vehicle vertically a sufficient distance to permit the rear pilot wheels to clear the rails, the horizontal portion of the outrigger may be retracted (or extended) to effect a lateral shifting of the rear end of the vehicle and thereby align the rear pilot wheels with the rails.

Having now described and illustrated one form of the invention, it is to be understood that the invention is not to be limited to the specific form or arrangement of parts herein and described and shown.

We claim

1. In a combined road and rail vehicle: a body structure; a plurality of longitudinally-spaced transverse axles connected to the body structure; a pair of laterally-spaced road wheels rotatably carried by each of said axles front and rear; outrigger means mounted on said body structure actuable for lateral and vertical movement relative to said body structure to shift said body structure; first ram means for actuating the outrigger means to shift the body structure vertically; second hydraulic means for actuating the outrigger means to shift the rear end of the vehicle laterally with respect to the outrigger means; at least two longitudinally-spaced pairs of laterally-spaced, flanged pilot wheels adapted to run upon rails in tandem with said road wheels; mounting means on the body structure for mounting each pair of said pilot wheels on the body structure; said mounting means actuable to shift the pilot wheels to and from a rail guiding position; and third ram means for actuating said mounting means to shift the pilot wheels into rail engaging position when said first ram means has actuated the outrigger means to raise the vehicle vertically.

2. In a combined road and rail vehicle a body structure; a plurality of longitudinally-spaced transverse axles connected to the body structure; a pair of laterally-spaced road wheels rotatably carried by each of said axles; at least two longitudinally-spaced pairs of laterally-spaced, flanged pilot wheels adapted to run upon rails in tandem with said road wheels; and mounting means for mounting each pair of said pilot wheels on the body structure; said mounting means comprising: laterally-spaced pilot wheel supporting members; a pivotal connection intermediate the ends of each of said members joining each of said members to said body structure for lateral and vertical shifting of the members; axle means secured to the lower end of each of said members for rotatably carrying a pilot wheel; and power means operably connected to the upper portion of each of said members at a point spaced above said pivotal connection, for shifting said pilot wheels vertically and laterally to and from guiding position.

3. A combined road and rail vehicle according to claim 2, further characterized by the fact that the power means for shifting the pilot wheels is a double-acting hydraulic ram interconnecting said upper portions of the support members.

4. A combined road and rail vehicle according to claim 3, further characterized by the fact that the pivot axes of the pilot-wheel supporting members are located inwardly of and above the rail contacting surface of the pilot wheels whereby the cooperating flanges are biased outwardly when the pilot wheels are under load.

5. A combined road and rail vehicle according to claim 2, further characterized by the fact that the vehicle includes outrigger means mounted on said body structure for lateral and vertical movement relative to said body structure and adapted to shift said body structure and said pilot wheels laterally and vertically into a rail-travelling position on a pair of spaced rails when the pilot wheels are in a rail-guiding position; power means for laterally and vertically moving said outrigger means; and control means for said power means.

6. A method of manipulating a combined road and rail vehicle having a body structure, a plurality of longitudinally-spaced transverse axles connected to the body structure, a pair of laterally-spaced road wheels rotatably carried by each of said axles, at least two longitudinally-spaced pairs of laterally-spaced pilot wheels adapted to run upon laterally-spaced rails in tandem with said road wheels, mounting means on the body structure for mounting each pair of said pilot wheels on the body structure, said mounting means adapted to shift the pilot wheels to and from a rail guiding position, longitudinally-spaced outrigger means mounted on the front and the rear of the body structure and actuable for lateral movement relative to said body structure and vertical ram assemblies carried by each of said outrigger means, said ram assemblies independently actuable for vertical movement relative to said body structure, said method comprising: positioning said vehicle in substantial longitudinal alignment with a pair of laterally-spaced rails so that at least the front pair of the longitudinally-spaced pilot wheels when in a rail-guiding position are in vertical alignment with the rails, vertically extending all of the ram assemblies to a ground engaging position while the horizontal outriggers are in a retracted position, extending both pairs of said pilot wheels to a rail-guiding position, rotating the crane turntable to shift the center of gravity of the vehicle and to prevent tipping of the vehicle upon vertical retraction of the ram assembly toward which the vehicle is to be shifted, vertically retracting the ram assembly toward which the vehicle is to be shifted and on the vehicle rear end to be shifted to accomplish alignment of the rear pair of pilot wheels then laterally spaced from the rails, laterally extending the horizontal outrigger carrying said retracted vertical ram toward which the vehicle is to be shifted, vertically extending that vertical ram toward which the vehicle is to be shifted so that said vertical ram is supporting a portion of the weight of the vehicle, vertically retracting all vertical rams except that ram toward which the vehicle is to be shifted, and retracting laterally the horizontal outrigger means carrying said extended vertical ram thereby shifting the vehicle toward said extended vertical ram and to a position in which both pairs of pilot wheels are in alignment and engagement with the rails.

7. (Generic to both methods of manipulating the vehicle.) A method of manipulating a combined road and rail vehicle having a body structure, a plurality of longitudinally-spaced transverse axles connected to the body structure, a pair of laterally-spaced road wheels rotatably carried by each of said axles, at least two longitudinally-spaced pairs of laterally-spaced pilot wheels adapted to run upon laterally-spaced rails in tandem with said road wheels, mounting means on the body structure for mounting each pair of said pilot wheels on the body structure, said mounting means adapted to shift the pilot wheels to and from a rail guiding position, longitudinally-spaced outrigger means mounted on the front and the rear of the body structure and actuable for lateral movement relative to said body structure and vertical ram assemblies carried by each of said outrigger means, said ram assemblies independently actuable for vertical movement relative to said body structure, said method comprising: positioning said vehicle in substantial longitudinal alignment with a pair of laterally-spaced rails so that at least the front pair of the longitudinally-spaced pilot wheels when in a rail-guiding position are in vertical alignment with the rails, positioning an horizontal outrigger on the rear end of the vehicle to be shifted so that movement of said vehicle end in relation to the vertical ram assembly carried by said horizontal outrigger will be in a direction toward said laterally-spaced rails, vertically extending to a ground engaging position said vertical ram assembly so that said ram is supporting a portion of the weight of the vehicle, actuating the horizontal outrigger carrying said ground engaging ram assembly to cause lateral shifting of the vehicle with respect to said ram assembly in a direction toward said laterally-spaced rails and to a position to permit alignment of both pairs of pilot wheels and with said rails, vertically extending to a ground engaging position all of the remaining vertical ram assemblies to permit lowering of the pilot wheel, extended both pairs of said pilot wheels to a rail guiding position, and vertically retracting all vertical ram assemblies.

8. A method of manipulating a combined road and rail vehicle having a body structure, a plurality of longitudinally-spaced transverse axles connected to the body structure, a pair of laterally-spaced road wheels rotatably carried by each of said axles, at least two longitudinally-spaced pairs of laterally-spaced pilot wheels adapted to run upon laterally-spaced rails in tandem with said road wheels, mounting means on the body structure for mounting each pair of said pilot wheels on the body structure, said mounting means adapted to shift the pilot wheels to and from a rail guiding position, longitudinally-spaced outrigger means mounted on the front and the rear of the body structure and actuable for lateral movement relative to said body structure and vertical ram assemblies carried by each of said outrigger means, said ram assemblies independently actuable for vertical movement relative to said body structure, said method comprising: positioning said vehicle in substantial longitudinal alignment with a pair of laterally-spaced rails so that at least the front pair of the longitudinally-spaced pilot wheels when in a rail-guiding position are in vertical alignment with the rails, vertically extending all of the ram assemblies to a ground engaging position while the horizontal outriggers are in a retracted position, extending both pairs of said pilot wheels to a rail-guiding position, vertically retracting all ram assemblies except that ram assembly away from which the vehicle is to be shifted and on the vehicle rear end to be shifted to accomplish alignment of the rear pair of pilot wheels then laterally-spaced from the rails, extending the outrigger means carrying said ground-engaging rear ram assembly thereby shifting said vehicle away from said ground-engaging ram assembly and to a position in which both pairs of pilot wheels are in alignment and engagement with the rails.

References Cited in the file of this patent

UNITED STATES PATENTS

| | | |
|---|---|---|
| 1,727,114 | Oechsle | Sept. 3, 1929 |
| 1,906,109 | Schmidt | Apr. 25, 1933 |
| 2,304,622 | Barrett | Dec. 8, 1942 |
| 2,482,564 | Townsend | Sept. 20, 1949 |
| 2,630,766 | Wunsch | Mar. 10, 1953 |
| 2,681,231 | Kondrocki | June 15, 1954 |
| 2,808,289 | Scoby | Oct. 1, 1957 |

FOREIGN PATENTS

| | | |
|---|---|---|
| 528,037 | Canada | July 24, 1956 |
| 978,113 | France | Nov. 22, 1950 |